US012709690B2

(12) United States Patent
Araki et al.

(10) Patent No.: US 12,709,690 B2
(45) Date of Patent: Aug. 18, 2026

(54) THERMOSETTING CONDUCTIVE RESIN COMPOSITION AND METHOD FOR PRODUCING ELECTRONIC COMPONENT

(71) Applicant: SHOEI CHEMICAL INC., Tokyo (JP)

(72) Inventors: Shohei Araki, Tosu (JP); Toshio Yoneima, Tosu (JP); Soichiro Esaki, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 79 days.

(21) Appl. No.: 18/710,161

(22) PCT Filed: Oct. 26, 2022

(86) PCT No.: PCT/JP2022/039888

§ 371 (c)(1),
(2) Date: Nov. 13, 2024

(87) PCT Pub. No.: WO2023/080028

PCT Pub. Date: May 11, 2023

(65) Prior Publication Data

US 2025/0188290 A1 Jun. 12, 2025

(30) Foreign Application Priority Data

Nov. 2, 2021 (JP) ................................ 2021-179759

(51) Int. Cl.

| | |
|---|---|
| ***H01B 1/22*** | (2006.01) |
| ***C09D 5/24*** | (2006.01) |
| ***C09D 7/40*** | (2018.01) |
| ***C09D 7/62*** | (2018.01) |
| ***C09D 7/63*** | (2018.01) |
| ***C09D 183/06*** | (2006.01) |
| ***H01G 9/00*** | (2006.01) |
| ***H01G 9/042*** | (2006.01) |
| *C08K 5/092* | (2006.01) |
| *C08K 5/17* | (2006.01) |
| *C08K 7/18* | (2006.01) |
| *H01G 9/15* | (2006.01) |

(52) U.S. Cl.

CPC ................. *C09D 5/24* (2013.01); *C09D 7/62* (2018.01); *C09D 7/63* (2018.01); *C09D 7/70* (2018.01); *C09D 183/06* (2013.01); *H01B 1/22* (2013.01); *H01G 9/0029* (2013.01); *H01G 9/0425* (2013.01); *C08K 5/092* (2013.01); *C08K 5/17* (2013.01); *C08K 7/18* (2013.01); *C08K 2201/001* (2013.01); *C08K 2201/014* (2013.01); *H01G 9/15* (2013.01)

(58) Field of Classification Search

CPC .... H01B 1/00; H01B 1/22; C09D 5/24; C08L 83/06; C08K 3/08; C08K 5/09; C08K 5/17

See application file for complete search history.

(56) References Cited

U.S. PATENT DOCUMENTS

| | | | | |
|---|---|---|---|---|
| 2015/0249167 | A1* | 9/2015 | Zhang | H10F 77/211 252/512 |
| 2016/0042864 | A1 | 2/2016 | Hong et al. | |
| 2016/0174385 | A1* | 6/2016 | Okabe | H01B 1/22 252/500 |
| 2020/0118703 | A1* | 4/2020 | Hirata | B22F 1/10 |

FOREIGN PATENT DOCUMENTS

| | | | | |
|---|---|---|---|---|
| CN | 102731744 | A | * 10/2012 | |
| EP | 4428198 | A1 | 9/2024 | |
| GB | 2036053 | B | * 5/1983 | C09D 183/04 |
| JP | H7073730 | A | 3/1995 | |
| JP | 2011142052 | A | 7/2011 | |
| JP | 2013510220 | A | 3/2013 | |
| JP | 2014135463 | A | 7/2014 | |
| JP | 2015537068 | A | 12/2015 | |
| WO | 2009144925 | A1 | 12/2009 | |
| WO | 2013111438 | A1 | 8/2013 | |
| WO | 2017126382 | A1 | 7/2017 | |
| WO | 2019009146 | A1 | 1/2019 | |
| WO | 2020250675 | A1 | 12/2020 | |
| WO | 2023080028 | A1 | 5/2023 | |

OTHER PUBLICATIONS

Unwin et al "Effect of amine and thiol addition on the surface chemistry and agglomeration of fine Cu powders", Colloids and Surfaces A: Physicochem. Eng. Aspects 325 (2008) 72-80.*

Qi et al "Rapid low temperature sintering in air of copper submicron particles with synergistic surface-activation and anti-oxidative protection", Journal of Materials Science: Materials in Electronics (2019) 30:12669-12678.*

European Patent Office, Extended European Search Report Issued in Application No. 22889848.2, Oct. 1, 2025, Germany, 7 pages.

Ishibashi, Hideo., "Preparation of Metal Nano-Particles and Their Application to Circuit Pattern Formation by Ink Jet Printing," Journal of the Japan Institute of Electronics Packaging, vol. 11, No. 2, May 1, 2008, 7 pages. (See International Search Report Issued in Application No. PCT/JP2022/039888 for explanation of relevance.).

ISA Japan Patent Office, International Search Report Issued in Application No. PCT/JP2022/039888, Dec. 20, 2022, WIPO, 6 pages.

* cited by examiner

*Primary Examiner* — Mark Kopec
(74) *Attorney, Agent, or Firm* — Alleman Hall LLP

(57) ABSTRACT

Provided is a thermosetting conductive resin composition including: a conductive powder including a base metal; a thermosetting silicone resin having hydroxyl groups; and at least one of an amine-based additive and an acid-based additive. According to the present invention, a thermosetting conductive resin composition for forming electrodes of electronic components can be provided that has high viscosity stability and can form a conductive resin layer having a reduced decrease in conductivity (excellent conductivity) and excellent moisture resistance, even when the thermosetting silicone resin having hydroxyl groups and the conductive powder including a base metal such as Cu are included.

15 Claims, No Drawings

THERMOSETTING CONDUCTIVE RESIN COMPOSITION AND METHOD FOR PRODUCING ELECTRONIC COMPONENT

TECHNICAL FIELD

The present invention relates to a thermosetting conductive resin composition for forming electrodes of electronic components for producing electronic components by forming electrodes on an electrode-forming body for electronic components such as a laminated body for multilayer electronic components and a cathode-forming body for solid electrolytic capacitors. The present invention also relates to a method for producing an electronic component by forming electrodes on an electrode-forming body for electronic components such as a laminated body for multilayer electronic components and a cathode-forming body for solid electrolytic capacitors.

BACKGROUND ART

In recent years, electronic devices have been used in harsher environments than ever before and thus electronic components mounted in electronic devices have also been required to be capable of being failure-free even when used in harsher environments than ever before.

Specifically, high impact resistance is required so that even if the electronic components are subjected to impact, for example, by being dropped in the case of mobile devices such as smart phones or by vibration during driving in the case of electronic devices mounted in automobiles, the electronic components do not drop from the substrate due to generation of cracks or interface delamination at the connection part between a substrate and electronic components or cracks are not generated on the electronic components themselves.

Mobile devices and automobiles can be exposed to humid environments, and thus the electronic components mounted in the mobile devices and the automobiles are required to have high moisture resistance so as to prevent moisture from penetrating inside.

Here, Patent Literature 1 has disclosed a composition that does not include an epoxy resin and includes a silicone rubber (polydimethylsiloxane) in a gel form and a conductive powder and has described that by forming a conductive resin layer on the outer surface of the external electrode of a multilayer ceramic capacitor using the composition, bending strength of the outer electrode further excellent than when using a composition including an epoxy resin is achieved, while having moisture resistance in the sense that the conductive resin layer can effectively block penetration of a plating solution.

CITATION LIST

Patent Literature

Patent Literature 1: Japanese Patent Publication 2014-135463-A

SUMMARY OF INVENTION

Technical Problem

As described above, Patent Literature 1 has disclosed that a certain level of moisture resistance can be achieved by using the silicone rubber. However, silicone rubbers and silicone resins are frequently used for insulating applications due to remarkably high insulating properties and conductivity is difficult to obtain in many cases when the silicone resin is used for conductive applications.

Therefore, the inventors of the present invention have conducted intensive studies for solving the above problems and have found that both moisture resistance and conductivity can be satisfied by forming a conductive resin layer using a thermosetting conductive resin composition including a thermosetting silicone resin having hydroxyl groups. However, in the case where a conductive powder including a base metal such as Cu is used as the conductive powder for the composition, the inventors of the present invention have found that a new problem in which the viscosity of the conductive resin composition increase over time in some cases and a new problem in which conductivity decrease (excellent conductivity is not achieved) in some cases.

Therefore, an object of the present invention is to provide a thermosetting conductive resin composition for forming electrodes of electronic components that has high viscosity stability and can form a conductive resin layer having a reduced decrease in conductivity (excellent conductivity) and excellent moisture resistance, even when the thermosetting silicone resin having hydroxyl groups and the conductive powder including a base metal such as Cu are included.

Solution to Problem

As a result of intensive study to solve the above problems, the inventors of the present invention have found that a thermosetting conductive resin composition includes the conductive powder including a base metal such as Cu, the thermosetting silicone resin having hydroxyl groups, and in addition to these components, at least one of an amine-based additive and an acid-based additive, whereby the thermosetting conductive resin composition having high viscosity stability, reducing decrease in conductivity (conductivity is excellent), and having excellent moisture resistance can be obtained. Therefore, the inventors of the present invention have accomplished the present invention.

Namely, the present invention (1) provides a thermosetting conductive resin composition comprising:

a conductive powder including a base metal;

a thermosetting silicone resin having hydroxyl groups; and at least one of an amine-based additive and an acid-based additive.

In addition, the present invention (2) provides the thermosetting conductive resin composition according to (1), in which a molecular weight of the amine-based additive or the acid-based additive is 30 or more and 2,000 or less.

In addition, invention (3) provides the thermosetting conductive resin composition according to (1) or (2), in which a boiling point Tb under 1 atm or a temperature Td90 at 90% by mass reduction of the amine-based additive or the acid-based additive is 80° C. or more and 400° C. or less.

The present invention (4) also provides the thermosetting conductive resin composition according any one of (1) to (3), in which the amine-based additive comprises at least one of a secondary amine and a tertiary amine.

In addition, the present invention (5) provides the thermosetting conductive resin composition according to any one of (1) to (4), in which the acid-based additive comprises a dicarboxylic acid.

In addition, the invention (6) provides the thermosetting conductive resin composition according to (1), in which a content of the amine-based additive is 0.6 parts by mass or more and 10.0 parts by mass or less relative to 100 parts by mass of the thermosetting silicone resin having hydroxyl groups and/or a content of the acid-based additive is 0.1 parts by mass to 1.6 parts by mass relative to 100 parts by mass of the conductive powder including the base metal.

In addition, the present invention (7) provides A method for producing an electronic component, the method comprising:

a preparation step of preparing an electrode-forming body for electronic components; and an electrode forming step of forming an electrode on an outer surface of the electrode-forming body for electronic components, in which a conductive resin layer is formed on the electrode-forming body for electronic components by applying the thermosetting conductive resin composition according to any one of (1) to (6) onto the electrode-forming body for electronic components and subsequently curing the thermosetting conductive resin composition in the electrode forming step.

Advantageous Effect of Invention

According to the present invention, a thermosetting conductive resin composition for forming electrodes of electronic components can be provided that has high viscosity stability and can form a conductive resin layer having a reduced decrease in conductivity (excellent conductivity) and excellent moisture resistance, even when the thermosetting silicone resin having hydroxyl groups and the conductive powder including a base metal such as Cu are included.

DESCRIPTION OF EMBODIMENTS

The thermosetting conductive resin composition according to the present invention includes a conductive powder including a base metal, a thermosetting silicone resin having hydroxyl groups, and at least one of an amine-based additive and an acid-based additive. This allows a conductive resin layer having excellent moisture resistance and conductivity to be formed and further viscosity stability to be excellent. Although the reason is not certain, the inventors of the present invention presume the reason as follows. In other words, in the case where the thermosetting silicone resin having hydroxyl groups and the conductive powder including the base metal such as Cu exist in the composition, the viscosity of the composition increases over time and heat curing is inhibited due to a reaction between the base metal such as Cu and the hydroxyl groups. The existence of the amine-based additive in the composition allows the amine-based additive to protect the hydroxyl groups of the resin from the base metal such as Cu due to coordination to the hydroxyl groups of the resin to reduce the increase in the viscosity of the composition over time and to reduce the decrease in the conductivity of the obtained conductive resin layer due to reduction in curing inhibition (excellent conductivity is achieved). In addition, the existence of the acid-based additive in the composition allows the acid-based additive to bond to the surface of the conductive powder to prevent contact between the base metal such as Cu and the hydroxyl groups of the thermosetting silicone resin, whereby the increase in the viscosity of the composition over time can be reduced and the decrease in the conductivity of the obtained conductive resin layer can be reduced due to reduction in curing inhibition (excellent conductivity can be achieved).

The thermosetting conductive resin composition according to the present invention is a thermosetting conductive resin composition that is cured by heating to form a cured film (a conductive resin layer). A heating temperature is not particularly limited. For example, a temperature in the range of 150° C. to 300° C. or 180° C. to 250° C. can be exemplified.

The thermosetting conductive resin composition according to the present invention includes the conductive powder. The thermosetting conductive resin composition according to the present invention includes at least the conductive powder including the base metal as the conductive powder. Examples of the conductive powders including the base metal include base metal powders, base metal alloy powders formed of alloys of two or more base metals, precious metal-coated base metal powders in which the surface of the base metal powder is coated with a precious metal, and alloy powders formed of base metals and precious metals. Examples of the conductive powder including the base metal include a copper powder, a silver-coated copper powder, a copper alloy powder, a silver-lead alloy powder, a tin powder, a nickel powder, a silver-coated nickel powder, a copper-nickel alloy powder, an iron powder, a zinc powder, and an aluminum powder. The silver powder easily causes ion migration, and thus silver-free powders, that is, the base metal powders, in particular, the copper powder, are preferable from the viewpoint that the base metal powders are less likely to cause the ion migration. From the viewpoint of low cost, the silver-coated copper powder, the copper powder, and a copper alloy powder not including expensive metal components such as precious metals or rare metals are preferable and the copper powder is particularly preferable. The silver-coated copper powder is preferable as the conductive powder including the base metal from the viewpoint of the excellent conductivity. As the silver-coated copper powder, silver can cover at least a part of the copper powder surface. In the thermosetting conductive resin compositions according to the present invention, the conductive powder preferably includes Cu from the viewpoint of various aspects as described above. On the other hand, in the composition including the thermosetting silicone resin having hydroxyl groups, problems of viscosity increase and conductivity decrease are likely to occur in the case where the conductive powder including the base metal is used. These problems are particularly likely to occur in the case where the conductive powder including Cu is used. In the thermosetting conductive resin composition according to the present invention, using the amine-based additive or the acid-based additive allows the above problems that occur in the case where the thermosetting silicone resin having hydroxyl groups and the conductive powder including the base metal are combined to be solved. In particular, using Cu as the base metal allows the problems that occur in the case where the thermosetting silicone resin having hydroxyl groups and the conductive powder including Cu are combined to be solved while the advantages of the conductive powder including Cu are being maximized. In other words, in the present invention, combining the conductive powder including Cu, the thermosetting silicone resin having hydroxyl groups, and at least one of the amine-based additive and the acid-based additive allows the effect of the present invention to be remarkably exhibited. In the present specification, the term "base metal" refers to copper or metals having greater ionization tendency than that of copper such as copper, iron, nickel, aluminum, lead, zinc, and tin and the term "precious metal" refers to metals having smaller ionization tendency than that of copper such as gold, silver, and platinum.

In the thermosetting conductive resin composition according to the present invention, the shape of the conductive powder is not particularly limited. Examples of the shape include a spherical shape or a flake-like shape. From the viewpoint of excellent conductivity and adhesion, the flake-like shape is preferable.

The thermosetting conductive resin composition according to the present invention can further include other conductive powders in addition to the conductive powder including the base metal described above. In other words, the thermosetting conductive resin composition according to the present invention can consist of the conductive powder including the base metal or can include the conductive powder including the base metal and the conductive powder including the precious metal as the conductive powder. The shape of the other conductive powders is not particularly limited. Examples of the shape include a spherical shape or a flake-like shape. From the viewpoint of conductivity and adhesion, the flake-like shape is preferable.

In the thermosetting conductive resin composition according to the present invention, the flake-shaped conductive powder content ratio relative to the total conductive powder is preferably 20.0% by mass or more, more preferably 40.0% by mass or more, and particularly preferably 60.0% by mass or more. The content ratio of the flake-shaped conductive powder relative to the total conductive powder within the above range allows the conductivity and adhesion of the obtained conductive resin layer to be high.

The aspect ratio of the flake-shaped conductive powder is preferably 1.5 to 50.0, more preferably 2.0 to 30.0, and particularly preferably 5.0 to 20.0. The aspect ratio of the flake-shaped conductive powder within the above range allows the conductivity and adhesion of the obtained conductive resin layer to be high. In the present invention, the aspect ratio of the flake-shaped conductive powder is determined as the average value of the ratio of the major axis to the thickness (major axis/thickness) determined by measuring the major axes and thicknesses of arbitrarily selected 50 conductive powders in scanning electron microscope (SEM) image observation.

The number average particle diameter of the flake-shaped conductive powder when measured using a scanning electron microscope (SEM) is preferably 0.1 μm to 20.0 μm, more preferably 0.3 μm to 15.0 μm, further preferably 0.5 μm to 10.0 μm, and particularly preferably 1.0 μm to 5.0 μm. The number average particle diameter of the flake-shaped conductive powder within the above range allows the conductivity and adhesion of the obtained conductive resin layer to be high. In the present invention, the major axes of the arbitrarily selected 50 conductive powders are measured in SEM (scanning electron microscope) image observation and the average value is determined as the number average particle diameter of the flake-shaped conductive powder.

The specific surface area of the flake-shaped conductive powder is preferably 0.5 $m^2/g$ to 5.0 $m^2/g$ and particularly preferably 0.6 $m^2/g$ to 4.0 $m^2/g$. The specific surface area of the flake-shaped conductive powder within the above range allows the conductivity and adhesion of the obtained conductive resin layer to be high.

The volume-based cumulative 50% particle diameter ($D_{50}$) of the spherical conductive powder is preferably 0.01 μm to 7.0 μm and particularly preferably 0.03 μm to 5.0 μm. The $D_{50}$ of the spherical conductive powder within the above range allows the conductivity and adhesion of the obtained conductive resin layer to be high. In the present invention, $D_{50}$ was determined as the 50% value ($D_{50}$) in the volume-based cumulative fraction using a laser diffraction particle size analyzer.

The specific surface area of the spherical conductive powder is preferably 0.2 m2/g to 3.0 $m^2/g$ and particularly preferably 0.3 $m^2/g$ to 2.5 $m^2/g$. The specific surface area of the spherical conductive powder within the above range allows the conductivity and adhesiveness of the obtained conductive resin layer to be high.

The thermosetting conductive resin composition according to the present invention includes a resin binder. The thermosetting conductive resin composition according to the present invention includes at least the thermosetting silicone resin having hydroxyl groups as the resin binder. The thermosetting silicone resins having hydroxyl groups is preferably a condensation-type thermosetting silicone resin having hydroxyl groups and is cured by a condensation reaction that proceeds by heating, more preferably a dehydration condensation-type silicone resin having hydroxyl groups and is cured by a dehydration condensation reaction that proceeds by heating, and particularly preferably a dehydration condensation-type thermosetting silicone resin having hydroxyl groups bonded to silicon atoms (silanol groups) and is cured by a dehydration condensation reaction that proceeds by heating.

The content ratio of the thermosetting silicone resin having hydroxyl groups relative to the total resin binder included in the thermosetting conductive resin composition according to the present invention is preferably 25.0% by mass or more, more preferably 30.0% by mass or more, more preferably 40.0% by mass or more, more preferably 50.0% by mass or more, more preferably 60.0% by mass or more, more preferably 70.0% by mass or more, more preferably 80.0% by mass or more, more preferably 90.0% by mass or more, and particularly preferably 95.0% by mass or more. Including the thermosetting silicone resin having hydroxyl groups in the thermosetting conductive resin composition within the above range allows the moisture resistance of the conductive resin layer to be high and the effect of reducing the specific resistance decrease effect and the viscosity increase inhibition effect caused by using the amine-based additive or the acid-based additive to be significant.

The thermosetting silicone resin having hydroxyl groups is cured by heating without using a curing agent or a catalyst. As a type of the heat curing, a condensation curing type, in which a condensation reaction proceeds by heating to cure the composition, is preferable. The dehydration-condensation type, in which a dehydration-condensation reaction proceeds by heating to cure the composition, is particularly preferable.

The position and number of hydroxyl groups in thermosetting silicone resin having hydroxyl groups are not particularly limited. For example, one end of the polymer, both ends of the polymer, and side chains of the polymer can have the hydroxyl groups. From the viewpoint of excellent conductivity, at least the side chains preferably have a plurality of hydroxyl groups. The hydroxyl groups can be bonded to silicon atoms or to other atoms other than silicon atoms (for example, carbon atoms). In the present specification, OH groups bonded to Si in silanol groups are also referred to as hydroxyl groups.

The main skeleton (main chain) of the thermosetting silicone resin having hydroxyl groups is required to have siloxane units. For example, a polymer consisting of siloxane units alone (polysiloxane) or a copolymer containing siloxane units can be exemplified. Examples of the copolymers containing siloxane units include copolymers of at least any of monomers, oligomers, and polymers containing the siloxane units and at least any of monomers, oligomers, and polymers without containing the siloxane units. These polymers and copolymers can be linear or branched.

The thermosetting silicone resins having hydroxyl groups can have other functional groups other than hydroxyl groups on the side chains or ends of the polymer. Examples of other functional groups include alkenyl groups, hydrogensilyl groups, (meth)acryloyl groups, epoxy groups, amino groups, carbinol groups, mercapto groups, carboxy groups, phenol groups, aryl groups, alkyl groups such as a methyl group, and aromatic groups such as a phenyl group. As the functional groups in the thermosetting silicone resin, alkyl groups such as a methyl group and aromatic groups such as a phenyl group are preferable from the viewpoint of moisture resistance, hydroxyl groups are preferable from the viewpoint of conductivity, and epoxy groups are preferable from the viewpoint of adhesion.

The thermosetting silicone resin having hydroxyl groups can be modified resins in which various oligomers, polymers, or the like are introduced (grafted) to the side chains or ends of the polymer or can be cross-linked resins in which the resins are cross-linked.

The molecular weight (weight average molecular weight Mw) of the thermosetting silicone resin having hydroxyl groups is not particularly limited and is preferably 1,000 to 300,000 and particularly preferably 2,000 to 200,000.

The thermosetting conductive resin composition according to the present invention can further include curing agents and catalysts. Examples of the curing agents and the catalysts include platinum-based, titanium-based, aluminum-based, zinc-based, iron-based, and phosphate-based curing agents and catalysts.

The thermosetting conductive resin composition according to the present invention can further include the resin binder other than the thermosetting silicone resin having hydroxyl groups in the range where the effect of the present invention is not impaired. The resin binders other than the thermosetting silicone resin having hydroxyl groups can be thermosetting resins or can be thermoplastic resins. Examples of the resin binders other than the thermosetting silicone resin having hydroxyl groups include cellulose-based resins such as ethyl cellulose, acetal-based resins such as a polyvinyl acetal resin, polyimide resins, polyamide resins, polyamideimide resins, epoxy resins, acrylic resins, butadiene-based resins such as polybutadiene, (meth)acrylic resins, styrene resins, phenol resins, alkyd resins, polyurethane resins, and silicone resins different from the thermosetting silicone resin having hydroxyl groups.

The content of the resin binder in the thermosetting conductive resin composition according to the present invention is preferably 3.0 parts by mass to 30.0 parts by mass, more preferably 3.0 parts by mass to 28.0 parts by mass, more preferably 3.0 parts by mass to 25.0 parts by mass, more preferably 5.0 parts by mass to 25.0 parts by mass, more preferably 7.0 parts by mass to 23.0 parts by mass, and particularly preferably 11.0 parts by mass to 20.0 parts by mass relative to 100.0 parts by mass of the conductive powder. The thermosetting conductive resin composition having the resin binder content within the above range allows the conductive resin layer having excellent conductivity and adhesion to be easily obtained. In addition, the thermosetting conductive resin composition tends to have excellent printability when applied to the electrode-forming body.

The thermosetting conductive resin composition according to the present invention includes at least one of the amine-based additive and the acid-based additive. Including the amine-based additive and/or the acid-based additive in the thermosetting conductive resin composition according to the present invention allows the viscosity stability to be high and the decrease in conductivity to be reduced (excellent conductivity is achieved), even when the thermosetting silicone resin having hydroxyl groups and conductive powder including the base metal are included. In particular, use of the amine-based additive as the additive is preferable because the effects of the present invention are easily achieved. The case where the amine-based additive and the acid-based additive are used together as the additives is preferable because the effects of the present invention are easily achieved.

The amine-based additive is not particularly limited. Examples of the amine-based additive include primary amines, secondary amines, and tertiary amines. In particular, in the case where the amine-based additive is the secondary amines and tertiary amines, these amines are preferable because the effects of the present invention are more suitably achieved. Of these amines, the secondary amines are preferable.

The molecular weight of the amine-based additive is preferably in the range of 10 or more and 5,000 or less, more preferably in the range of 20 or more and 3,000 or less, more preferably in the range of 30 or more and 2,000 or less, more preferably in the range of 40 or more and 1,000 or less, more preferably in the range of 50 or more and 500 or less, further preferably in the range of 80 or more and 350 or less, and particularly preferably in the range of 100 or more and 300 or less. The molecular weight of the amine-based additive within the above range allows the effect of the present invention to be more suitably achieved.

The carbon number of the amine-based additive is preferably 6 or more and 20 or less and particularly preferably 7 or more and 18 or less. This allows the effects of the present invention to be more suitably achieved.

The pKa of the amine-based additive measured in water at 25° C. is preferably 7.5 or more and 12.0 or less. This allows the effects of the present invention to be more suitably achieved.

The boiling point Tb under 1 atm or the temperature Td90 at 90% by mass reduction of the amine-based additive is preferably a reference temperature −100° C. or more and a reference temperature +30° C. or less, more preferably a reference temperature −75° C. or more and a reference temperature +20° C. or less, and particularly preferably a reference temperature −50° C. or more and a reference temperature +10° C. or less, when the curing temperature of the conductive resin composition is determined to be the reference temperature. The boiling point Tb under 1 atm or the temperature Td90 at 90% by mass reduction of the amine-based additive is preferably 80° C. or more and 400° C. or less, more preferably 80° C. or more and 350° C. or less, more preferably 80° C. or more and 300° C. or less, further preferably 100° C. or more and 250° C. or less, and particularly preferably 120° C. or more and 230° C. or less. The boiling point Tb under 1 atm or the temperature Td90 at 90% by mass reduction of the amine-based additive within the above range allows the effects of the present invention to be easily achieved because the amine-based additive acts in the conductive resin composition immediately before curing. The boiling point Tb under 1 atm or the temperature Td90 at 90% by mass reduction of the amine-based additive within the above range also allows the effects of the present invention to be easily achieved because the amine-based additive is easily vaporized or decomposed before completion of the curing and thus is less likely to inhibit curing. In addition, the obtained conductive resin layer tends to have excellent conductivity and moisture resistance because the amine-based additive is less likely to remain in the film after curing. The term "temperature Td90 at 90% by mass reduction" in the present specification refers to a temperature at which 90% by mass reduction occurs when temperature is increased at a rate of 10° C./min under conditions of 1 atm and atmospheric atmosphere.

Examples of the amine-based additive include monoamines, diamines, and triamines. The use of the diamines and the triamines is preferable because the effects of the present invention are remarkably achieved and the use of the diamines is particularly preferable because the effects of the present invention are more remarkably achieved. Further specific examples of the amine-based additive include monomethylamine, dimethylamine, trimethylamine, monoethylamine, diethylamine, triethylamine, monopropylamine, dipropylamine, diisopropylamine, tripropylamine, monobutylamine, dibutylamine, tributylamine, monopentylamine, dipentylamine, tripentylamine, monohexylamine, dihexylamine, trihexylamine, monoheptylamine, diheptylamine, triheptylamine, monooctylamine, dioctylamine, dimethyloctylamine, trioctylamine, dimethylethylamine, diethanolamine, polyoxyethylene laurylamine, N-lauryldiethanolamine, 3-(2-ethylhexyloxy)propylamine, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane, poly(tetramethylene/3-methyltetramethylene ether) glycol bis(4-aminobenzoate), poly(tetramethylene oxide-di-p-aminobenzoate), and triethanolamine. The case where the amine-based additive includes at least one or more amines selected from dibutylamine, triethanolamine, diisopropylamine, dihexylamine, dimethyloctylamine, and polyoxyethylene laurylamine is preferable because the effects of the present invention are more suitably achieved. In particular, the case where the amine-based additive includes at least one or more amines selected from dibutylamine, triethanolamine, and polyoxyethylene laurylamine is preferable because the effects of the present invention are further suitably achieved.

The acid-based additive is not particularly limited as long as the acid-based additive is organic acids. Examples of the acid-based additive include carboxylic acids such as monocarboxylic acids, dicarboxylic acids, and tricarboxylic acids. In particular, the case where the acid-based additive is the dicarboxylic acids is preferable because the effects of the present invention can be more suitably achieved. Examples of dicarboxylic acids include oxalic acid, malonic acid, succinic acid, glutaric acid, adipic acid, pimelic acid, suberic acid, azelaic acid, sebacic acid, phthalic acid, isophthalic acid, terephthalic acid, octenyl succinic acid, and octadecyl butanedioic acid. In particular, the case where the acid-based additive is octadecyl butanedioic acid is preferable because the effects of the present invention are more suitably achieved.

The molecular weight of the acid-based additive is preferably in the range of 10 or more and 5,000 or less, more preferably in the range of 20 or more and 3,000 or less, more preferably in the range of 30 or more and 2,000 or less, further preferably in the range of 100 or more and 1,000 or less, and particularly preferably in the range of 250 or more and 750 or less. The molecular weight of the acid-based additive within the above range allows the effects of the present invention to be more suitably achieved.

The carbon number of the acid-based additive is preferably 10 or more and 35 or less and particularly preferably 15 or more and 25 or less. This allows the effects of the present invention to be more suitably achieved.

The pKa of the acid-based additive measured in water at 25° C. is preferably 2.0 or more and 6.5 or less. This allows the effects of the present invention to be more suitably achieved.

The boiling point Tb under 1 atm or the temperature Td90 at 90% by mass reduction of the acid-based additive is preferably a reference temperature −100° C. or more and a reference temperature +30° C. or less, more preferably a reference temperature −75° C. or more and a reference temperature +20° C. or less, and particularly preferably a reference temperature −50° C. or more and a reference temperature +10° C. or less, when the curing temperature of the conductive resin composition is determined to be the reference temperature. The boiling point Tb under 1 atm or the temperature Td90 at 90% by mass reduction of the acid-based additive is preferably 80° C. or more and 350° C. or less, more preferably 80° C. or more and 300° C. or less, further preferably 100° C. or more and 250° C. or less, and particularly preferably 120° C. or more and 230° C. or less. The boiling point Tb under 1 atm or the temperature Td90 at 90% by mass reduction of the acid-based additive within the above range allows the effects of the present invention to be easily achieved because the acid-based additive acts in the conductive resin composition immediately before curing. The boiling point Tb under 1 atm or the temperature Td90 at 90% by mass reduction of the acid-based additive within the above range also allows the effects of the present invention to be easily achieved because the acid-based additive is easily vaporized or decomposed before completion of the curing and thus is less likely to inhibit curing. In addition, the obtained conductive resin layer tends to have excellent conductivity and moisture resistance because the amine-based additive is less likely to remain in the film after curing.

In the case where the thermosetting conductive resin composition according to the present invention consists of the amine-based additive out of the amine-based additive and the acid-based additive, the amount of the amine-based additive included in the thermosetting conductive resin composition according to the present invention is 0.3 parts by mass or more and 20.0 parts by mass or less, more preferably 0.6 parts by mass or more and 10.0 parts by mass or less, and particularly preferably 1.8 parts by mass or more and 6.0 parts by mass or less relative to 100 parts by mass of the thermosetting silicone resin having hydroxyl groups. The content of the amine-based additives within the above range allows the effects of the present invention to be more suitably achieved.

In the case where the thermosetting conductive resin composition according to the present invention consists of the amine-based additive out of the amine-based additive and the acid-based additive, the amount of the amine-based additive included in the thermosetting conductive resin composition according to the present invention is 0.05 parts by mass or more and 3.2 parts by mass or less, more preferably 0.1 parts by mass or more and 1.6 parts by mass or less, and particularly preferably 0.3 parts by mass or more and 1.4 parts by mass or less relative to 100 parts by mass of the conductive power including the base metal. The content of the amine-based additives within the above range allows the effects of the present invention to be more suitably achieved.

In the case where the thermosetting conductive resin composition according to the present invention consists of the acid-based additive out of the amine-based additive and the acid-based additive, the amount of the acid-based additive included in the thermosetting conductive resin composition according to the present invention is preferably 0.3 parts by mass or more and 20.0 parts by mass or less, more preferably 0.6 parts by mass or more and 10.0 parts by mass or less, and particularly preferably 1.8 parts by mass or more and 6.0 parts by mass or less relative to 100 parts by mass of the thermosetting silicone resin having hydroxyl groups. The content of the acid-based additives within the above range allows the effects of the present invention to be more suitably achieved.

In the case where the thermosetting conductive resin composition according to the present invention consists of the amine-based additive out of the amine-based additive and the acid-based additive, the amount of the amine-based additive included in the thermosetting conductive resin composition according to the present invention is preferably 0.05 parts by mass or more and 3.2 parts by mass or less, more preferably 0.1 parts by mass or more and 1.6 parts by mass or less, and particularly preferably 0.3 parts by mass or more and 1.4 parts by mass or less relative to 100 parts by mass of the conductive powder including the base metal. The content of the acid-based additives within the above range allows the effects of the present invention to be more suitably achieved.

In the case where the thermosetting conductive resin composition according to the present invention includes both of the amine-based additive and the acid-based additive, the total content of the amine-based additive and the acid-based additive included in the thermosetting conductive resin composition according to the present invention is 0.3 parts by mass or more and 20.0 parts by mass or less, more preferably 0.6 parts by mass or more and 10.0 parts by mass or less, and particularly preferably 1.8 parts by mass or more and 6.0 parts by mass or less relative to 100 parts by mass of the thermosetting silicone resin having hydroxyl groups. The total content of the amine-based additive and the acid-based additive within the above range allows the effects of the present invention to be more suitably achieved.

In the case where the thermosetting conductive resin composition according to the present invention includes both of the amine-based additive and the acid-based additive, the total content of the amine-based additive and the acid-based additive included in the thermosetting conductive resin composition according to the present invention is 0.05 parts by mass or more and 3.2 parts by mass or less, more preferably 0.1 parts by mass or more and 1.6 parts by mass or less, and particularly preferably 0.3 parts by mass or more and 1.4 parts by mass or less relative to 100 parts by mass of the conductive power including the base metal. The total content of the amine-based additive and the acid-based additive within the above range allows the effects of the present invention to be more suitably achieved.

In the case where the thermosetting conductive resin composition according to the present invention includes both of the amine-based additive and the acid-based additive, the amount of the amine-based additive included in the thermosetting conductive resin composition according to the present invention is preferably 0.3 parts by mass or more and 20.0 parts by mass or less, more preferably 0.6 parts by mass or more and 10.0 parts by mass or less, and particularly preferably 1.8 parts by mass or more and 6.0 parts by mass or less relative to 100 parts by mass of the thermosetting silicone resin having hydroxyl groups, and the content of the acid-based additive included in the thermosetting conductive resin composition according to the present invention is preferably 0.05 parts by mass or more and 3.2 parts by mass or less, more preferably 0.1 parts by mass or more and to 1.6 parts by mass or less, and particularly preferably 0.3 parts by mass or more and 1.4 parts by mass or less relative to 100 parts by mass of the conductive powder including the base metal.

The thermosetting conductive resin composition according to the present invention can further include organic solvents. Examples of the included organic solvents include, but are not particularly limited to, terpineol, dihydroterpineol, dihydroterpineol acetate, secondary butyl alcohol, butylcarbitol, butylcarbitol acetate, and benzyl alcohol. From the viewpoint of adhesion strength, acetate-based solvents are preferable and butylcarbitol acetate is particularly preferable.

In addition to the above components, the thermosetting conductive resin composition according to the present invention can include additives such as defoamers, plasticizers, dispersing agents, and rheology adjusters, if necessary. Examples of the plasticizers include dimethyl phthalate, diethyl phthalate, dibutyl phthalate, di-2-ethylhexyl phthalate, di-normal-octyl phthalate, butyl benzyl phthalate, dioctyl adipate, diisononyl adipate, dibutyl sebacate, diethyl sebacate, dioctyl sebacate, tricresyl phosphate, chlorinated paraffin, and cyclohexane 1,2-dicarboxylic acid diisononyl ester (DINCH). Examples of the rheology modifiers include silica powder.

The thermosetting conductive resin composition according to the present invention is suitably used for the forming external electrode of multilayer electronic components and for forming the cathode of solid electrolytic capacitors.

The moisture permeability amount of the thermosetting conductive resin component according to the present is preferably 80.0 mg or less, more preferably 40.0 mg or less, further preferably 20.0 mg or less, and particularly preferably 10.0 mg or less. The thermosetting conductive resin composition having the moisture permeability amount within the above range allows electronic components having excellent moisture resistance to be obtained in the case where the conductive resin layer is formed using the conductive resin composition according to the present invention. A method of measuring the moisture permeability amount of the conductive resin composition according to the present invention is not particularly limited. For example, the moisture permeability amount can be measured by a moisture permeability measurement test described below.

Moisture Permeability Amount Measurement Test

The conductive resin composition is cast at a thickness of 250 μm onto a PET film and the cast composition is cured under conditions of 200° C. for 60 minutes. The obtained cured film is cut out in a circular shape having a diameter of 7.5 mm and the circular film is fixed with an adhesive so as to cover a 5 ml grass bottle containing 2 g of silica gel. Thereafter, the glass bottle is placed in a 750 ml container containing 100 ml of purified water so that the cured film does not come in contact with the purified water and the resultant container in a sealed state is left to stand in a dryer set at 65° C. for 15 hours. Subsequently, the moisture permeability amount is calculated using the following formula (1):

Moisture permeability amount (amount of increased weight)=Weight of glass bottle after being placed in dryer−Weight of glass bottle before being placed in dryer (1).

The specific resistance of the conductive resin layer obtained by using the thermosetting conductive resin composition according to the present invention is preferably $1.0\times10^5$ μΩ·cm or less, more preferably $5.0\times10^4$ μΩ·cm or less, more preferably $1.0\times10^4$ μΩ·cm or less, more preferably $5.0\times10^3$ μΩ·cm or less, and more preferably $1.0\times10^3$ μΩ·cm or less. The method of measuring the specific resistance of the conductive resin composition according to the present invention is not particularly limited. For example, the specific resistance can be measured by the following specific resistance measurement test.

Specific Resistance Measurement Test

The conductive resin composition is cast at a width of 1 cm, a length of 5 cm, and a thickness of 50 μm on a slide glass substrate and cured under conditions of 200° C. for 60 minutes to give a cured film. Thereafter, the resistance of the cured film surface is measured by a 4-terminal method using a digital multimeter (for example, KEITHLEY 2002, manufactured by Keithley Instruments, Inc.). The specific resistance is calculated from the obtained value and the sample thickness.

The specific resistance decrease ratio of the thermosetting conductive resin composition according to the present invention is preferably 15% or more, more preferably 30% or more, more preferably 50% or more, more preferably 70% or more, more preferably 80% or more, further preferably 90% or more, and particularly preferably 95% or more. The thermosetting conductive resin composition having the specific resistance decreasing ratio within the above range allows electronic components having excellent conductivity to be obtained in the case where the conductive resin layer is formed using the conductive resin composition according to the present invention. A method for calculating the specific resistance decrease ratio of the conductive resin composition according to the present invention is not particularly limited. For example, the specific resistance decrease ratio can be calculated by the following method for calculating the specific resistance decrease ratio.

Method for Calculating Specific Resistance Decrease Ratio

When the thermosetting conductive resin composition according to the present invention including the additive according to the present invention (at least one of the amine-based additive and the acid-based additive) is determined to be a composition (X) and a thermosetting conductive resin composition having the same composition as the composition (X) except that the composition does not include the additive according to the present invention (at least one of the amine-based additive and the acid-based additive) is determined to be a composition (Y), each specific resistance is measured using the composition (X) and the composition (Y) by the specific resistance measurement test described above and the obtained specific resistances are determined to be (A) and (B), respectively. Subsequently, the specific resistance decrease ratio is calculated using the following formula (2):

$$\text{Specific resistance decrease ratio [\%]}=(1-(A)/(B))\times 100 \quad (2)$$

A method for measuring the viscosity of the thermosetting conductive resin composition according to the present invention is not particularly limited. For example, the viscosity can be measured using a rotational viscometer (model number: HADV-II+ Pro or HBDV-II+, manufactured by Brookfield Engineering Laboratories, Inc.) at 25° C. under a condition of a shear rate of 4 (1/s).

The viscosity increase ratio of the thermosetting conductive resin composition according to the present invention is preferably 10.0 times or less, more preferably 8.0 times or less, more preferably 6.0 times or less, more preferably 4.0 times or less, further preferably 2.0 times or less, and particularly preferably 1.5 times or less. The viscosity increase ratio within the above range allows the thermosetting conductive resin composition having excellent viscosity stability to be obtained. In the case where the viscosity stability is low, the viscosity increases over time. In the case where the viscosity increases, the printed shape deteriorate in some cases. For example, in the case where the thermosetting conductive resin composition according to the present invention is printed on electrode-forming bodies for electronic components such as a laminated body for multilayer electronic components or a cathode-forming body for solid electrolytic capacitors to form external electrodes or cathodes, the printed shape deteriorate in some cases. For example, the deteriorated printing shape causes the thickness of the corner parts of the outer electrode of multilayer electronic components or the cathode of solid electrolytic capacitors to be thin and thus the required moisture resistance fail to be achieved in some cases when the electronic component is formed. The thermosetting conductive resin composition according to the present invention has excellent viscosity stability and thus electronic components having high moisture resistance are easily obtained in a stable manner in the case where the electronic components are formed using the conductive resin composition according to the present invention. A method for calculating the viscosity increase ratio of the thermosetting conductive resin composition according to the present invention is not particularly limited. For example, the viscosity increase ratio can be calculated by a method for calculating the viscosity increase ratio described below.

Method for Calculating Viscosity Increase Ratio

The viscosities of the thermosetting conductive resin composition according to the present invention after 1 day from preparation and after 1 week from preparation are measured by the method for measuring the viscosity described above. Subsequently, the viscosity increase ratio is calculated by the following formula (3):

Viscosity increase ratio [times]=Viscosity after 1 week from preparation/Viscosity after 1 day from preparation (3).

(Viscosity Increase Inhibition Ratio)

The viscosity increase inhibition ratio of the thermosetting conductive resin composition according to the present invention is preferably 10% or more, more preferably 20% or more, more preferably 30% or more, more preferably 40% or more, more preferably 50% or more, more preferably 60% or more, more preferably 70% or more, further preferably 80% or more, and particularly preferably 90% or more. The viscosity increase inhibition ratio within the above range allows the thermosetting conductive resin composition having excellent viscosity stability to be achieved. For the same reasons described above, the excellent viscosity stability facilitates the electronic components having high moisture resistance to be stably obtained. A method of calculating the viscosity increase inhibition ratio of the thermosetting conductive resin composition according to the present invention is not particularly limited. For example, the viscosity increase reduction ratio can be measured by a method for calculating the viscosity increase inhibition ratio described below.

Method for Calculating Viscosity Increase Inhibition Ratio

When the thermosetting conductive resin composition according to the present invention including the additive according to the present invention (at least one of the amine-based additive and the acid-based additive) is determined to be a composition (X) and a thermosetting conductive resin composition having the same composition as the composition (X) except that the composition does not include the additive according to the present invention (at least one of the amine-based additive and the acid-based additive) is determined to be a composition (Y), each viscosity increase ratio is measured using the composition (X) and the composition (Y) by the viscosity increase ratio measurement test and the obtained viscosity increase ratios are determined to be (C) and (D). Subsequently, the viscosity increase inhibition ratio is calculated using the following formula (4):

$$\text{Viscosity increase inhibition ratio [\%]} = (1-(C)/(D)) \times 100 \quad (4).$$

The adhesion strength of the conductive resin layer obtained by using the thermosetting conductive resin composition according to the present invention is preferably 3.0 kg or more, more preferably 4.0 kg or more, further preferably 5.0 kg or more, and particularly preferably 6.0 kg or more. The adhesion strength of the conductive resin layer obtained by using the thermosetting conductive resin composition according to the present invention is not particularly limited. For example, the adhesion strength can be set to 20.0 kg or less. The conductive resin layer having the adhesion strength within the above range is formed between the metal layer and the plating layer of the external electrode of the multilayer electronic component, whereby cracks or interface delamination is difficult to generate in the connection area between the substrate and the electronic component and cracks are difficult to generate in the electronic component itself, resulting in increasing the impact resistance of the electronic components. Therefore, forming the conductive resin layer by using the conductive resin composition according to the present invention between the metal layer and the plating layer of the external electrode of the multilayer electronic component allows the impact resistance of the electronic component to be increased. The excellent adhesion strength also allows the conductive resin layer to be difficult to peel off from the electrode-forming body for electronic components, resulting in easily maintaining the moisture resistance as the electronic components. The method of measuring the adhesion strength is not particularly limited. For example, the adhesion strength can be measured by the following adhesion strength measurement test.

Adhesion Strength Measurement Test

The conductive resin composition is cast at a thickness of 50 μm onto a slide glass substrate and an alumina chip having a width of 1.5 mm, a length of 3.0 mm, and a height of 1.0 mm is placed on the cast composition. The cast composition is cured under conditions of 200° C. for 60 minutes. The adhesion strength is determined by measuring a value when the alumina chip is peeled off using a Bond Tester (type No.: SS-30WD, manufactured by Seishin Trading Co., Ltd.) applying a force at a speed of 0.3 mm/s in a horizontal direction.

The cured film density of the thermosetting conductive resin composition according to the present invention is preferably 2.0 g/cm$^3$ or more, more preferably 2.5 g/cm$^3$ or more, more preferably 3.0 g/cm$^3$ or more, further preferably 3.5 g/cm$^3$ or more, and particularly preferably 4.0 g/cm$^3$ or more. The cured film density within the above range allows electronic components having excellent conductivity and moisture resistance to be obtained in the case where the conductive resin layer is formed using the conductive resin composition according to the present invention. A method for measuring the cured film density of the conductive resin composition according to the present invention is not particularly limited. For example, the cured film density (g/cm$^3$) can be calculated as the ratio of a weight (g) to a volume (cm$^3$) by casting the conductive resin composition onto a PET film at a thickness of 250 μm to form a coating film, curing the coating film under conditions of an atmospheric atmosphere at 200° C. for 60 minutes to form a cured film, cutting the obtained cured film into a circular piece, and measuring the weight and the volume of the cut cured film.

The thermosetting conductive resin composition according to the present invention is suitable as a conductive resin composition for forming electrodes on an electrode-forming body (hereinafter referred to as "electrode-forming body for electronic components"), where electrodes are formed in the production of electronic components. Therefore, the thermosetting conductive resin composition according to the present invention is particularly suitable as a conductive resin composition for forming external electrodes of laminated bodies for multilayer electronic components and for forming cathodes of cathode-forming bodies for solid electrolytic capacitors.

In one example of use, the thermosetting conductive resin composition according to the present invention can be used in a method for producing an electronic component, the method comprising: a preparation step of preparing an electrode-forming body for electronic components, and an electrode forming step of forming an electrode on an outer surface of the electrode-forming body for electronic components. In the electrode forming step, the conductive resin layer is formed on the electrode-forming body for electronic components by using the thermosetting conductive resin composition according to the present invention to form the electrode.

The preparation step is a step of preparing the electrode-forming body for electronic components. The electrode-forming body for electronic components refers to an object on which electrodes are formed in the production process of the electronic components. Examples of the electrode-forming body for electronic components include a laminated body for multilayer electronic components formed of a plurality of ceramic layers and a plurality of internal electrode layers, a cathode-forming body for solid electrolytic capacitors formed of a anode and a dielectric layer formed on the anode surface, and an electrode-forming body for chip resistors equipped with end-surface electrodes.

The laminated body for multilayer electronic components is formed of a plurality of ceramic layers and a plurality of internal electrode layers. In the laminated body for multilayer electronic components, adjacent ceramic layers are connected to each other with an internal electrode layer interposed between the ceramic layers. Examples of the laminated body for multilayer electronic components include a laminated body for multilayer ceramic capacitors, a laminated body for multilayer ceramic inductors, and a laminated body for piezoelectric actuators.

Examples of the substances forming the ceramic layers constituting the laminated body for multilayer electronic components include barium titanate, strontium titanate, calcium titanate, barium zirconate, strontium zirconate, calcium zirconate, and calcium strontium zirconate.

Examples of the substances forming the internal electrode layer constituting the laminated body for multilayer electronic components include any of nickel, palladium, silver, copper, and gold, or alloys including one or more of these metals (for example, an alloy of silver and palladium).

The cathode forming body for solid electrolytic capacitors is made of a anode and a dielectric layer formed on the anode surface. Examples of the combinations of substances forming the anode and the dielectric layer include tantalum and tantalum pentoxide, aluminum and aluminum oxide, and niobium and niobium pentoxide.

The electrode forming step is a step of forming an electrode onto the outer surface of the electrode-forming body for electronic components. In the present invention, the phrase “forming the conductive resin layer on the electrode-forming body for electronic components” includes both of the case where the conductive resin layer is formed directly on the surface of the electrode-forming body for electronic components and the case where another layer or a film (for example, a metal layer and a conductive material layer) is formed on the electrode-forming body for electronic components first and then the conductive resin layer is formed on the surface thereof. Therefore, in the electronic component obtained by the method for producing an electronic component, both of the case where the conductive resin layer is formed directly on the surface of the electrode-forming body for electronic components and the case where the conductive resin layer is formed in a state where another layer or film (for example, the metal layer and the conductive material layer) is intervened between the electrode-forming bodies for electronic components.

In the electrode forming step, the position and method of forming electrodes, the thickness of the electrodes, the number of electrodes, the type of metal constituting the electrodes, and the shape of the conductive powder used for electrode formation are appropriately selected depending on the electronic components as production targets.

In the electrode forming step, the conductive resin layer is formed on the electrode-forming body for electronic components using the thermosetting conductive resin composition according to the present invention.

In the electrode forming step, the layer of the thermosetting conductive resin composition according to the present invention is formed at a predetermined position on the electrode-forming body for electronic components by applying the thermosetting conductive resin composition according to the present invention to the electrode-forming body for electronic components, and thereafter the conductive resin layer is formed by curing the thermosetting conductive resin composition according to the present invention. The curing described above is performed by heating.

In the electrode forming step, the conductive resin layer can be formed directly on the surface of the electrode-forming body for electronic components by applying the conductive resin composition according to the present invention directly to the surface of the electrode-forming body for electronic components. In the electrode forming step, appropriate steps can be included depending on the type of electronic components before the conductive resin layer is formed on the electrode-forming body for electronic components. For example, in the case of the multilayer electronic components, in the electrode forming step, the conductive resin layer is formed on the surface of a metal layer by forming the metal layer at a predetermined position of the electrode-forming body for the electronic component, thereafter forming the layer of the thermosetting conductive resin composition according to the present invention at a predetermined position in the electrode-forming body for electronic components by, for example, applying the thermosetting conductive resin composition according to the present invention on the surface of the metal layer, subsequently curing the thermosetting conductive resin composition according to the present invention. For example, in the case of the solid electrolytic capacitors, in the electrode forming step, the conductive resin layer is formed on the surface of a conductive layer by forming the conductive layer made of a carbon layer at a predetermined position of the cathode-forming body for solid electrolytic capacitors, thereafter forming the layer of the thermosetting conductive resin composition according to the present invention at a predetermined position in the electrode-forming body for electronic components by, for example, applying the thermosetting conductive resin composition according to the present invention on the surface of the conductive layer, subsequently curing the thermosetting conductive resin composition according to the present invention. In the electrode forming step, after the conductive resin layer is formed on the electrode-forming body for electronic components, the step can include appropriate steps depending on the type of the electronic components. For example, in the case of the multilayer electronic components, in the electrode formation step, the conductive resin layer is formed at a predetermined position on the electrode-forming body for electronic components, and thereafter a plating layer is formed on the surface of the conductive resin layer.

In the electrode forming step, the electrode can be formed by forming the conductive resin layer on the electrode-forming body for electronic components. In other words, in this aspect, the conductive resin layer alone constitutes the electrode.

In the electrode forming step, the layer of the thermosetting conductive resin composition according to the present invention can be formed at a predetermined position of the electrode-forming body for electronic components by applying the thermosetting conductive resin composition according to the present invention to the electrode-forming body for electronic components by a dipping method when the conductive resin layer is formed on the electrode-forming body for electronic components using the thermosetting conductive resin composition according to the present invention.

The first embodiment of the electrode forming step (hereinafter also referred to as an electrode forming step (1)) is an electrode forming step in the case where the electrode-forming body for electronic components is a laminated body for multilayer electronic components formed of ceramic layers and internal electrode layers. The electrode forming step (1) includes at least a conductive resin layer forming step (1A), in which the conductive resin layer is formed on the outer surface of the laminated body for multilayer electronic components using the conductive resin composition according to the present invention. The electrode forming step (1) is not particularly limited as long as the electrode forming step (1) includes the conductive resin layer forming step (1A) of forming the conductive resin layer on the outer surface of the laminated body for multilayer electronic components using the conductive resin composition according to the present invention. Examples of the electrode forming step (1) include an electrode forming step including at least a metal layer forming step, the conductive resin layer forming step (1A), and a plating layer forming step.

The metal layer formation step is a step of forming a metal layer electrically connected to the internal electrode layer on the outer surface of the laminate for multilayer electronic components. The metal forming the metal layer is at least one of Cu, Ag, Pd, Ni, Sn, Al, Au, and Pt, or an alloy containing one or more of these metals. Methods for forming the metal layers are not particularly limited. Examples of the method include a dipping method, a plating method, a roll coating method, a screen printing method, and a sputtering method. The thickness, shape, location, and number of metal layers can be appropriately selected.

The conductive resin layer forming step (1A) is a step of forming the conductive resin layer on the surface of the metal layer formed by performing the metal layer forming step, using the thermosetting conductive resin composition according to the present invention.

In the conductive resin layer forming step (1A), the layer of the conductive resin composition of the present invention is formed on the surface of the metal layer formed by performing the metal layer forming step by applying the conductive resin composition according to the present invention to the surface of the metal layer, and subsequently the conductive resin layer is formed by curing the thermosetting conductive resin composition according to the present invention. The method of forming the conductive resin layer is not particularly limited. Example of the method include the dipping method, the screen printing method, and the roll coating method. Of these methods, the dipping method is preferable. The thickness, shape, position, and number of the layers of the thermosetting conductive resin composition resin according to the present invention can be appropriately selected.

The plating layer forming step is a step of forming a plating layer on the surface of the conductive resin layer. Examples of the metal forming the plating layer include at least one of Ni, Cu, Sn, Ag, and Au, or an alloy including one or more of these metals. The method of forming the plating layer is not particularly limited. Examples of the method include electrolytic plating and electroless plating. The thickness, shape, position, and number of the plating layers can be appropriately selected.

The second embodiment of the electrode forming step (hereinafter also referred to as an electrode forming step (2)) is an electrode forming step in the case where the electrode-forming body for electronic components is the cathode-forming body for solid electrolytic capacitors. The electrode forming step (2) includes at least a conductive resin layer forming step (2A), in which the conductive resin layer is formed on the outer surface of the cathode-forming body for solid electrolytic capacitors using the conductive resin composition according to the present invention. The electrode forming step (2) is not particularly limited as long as the electrode forming step (2) includes the conductive resin layer forming step (2A) of forming the conductive resin layer on the outer surface of the cathode-forming body for solid electrolytic capacitors using the thermosetting conductive resin composition according to the present invention. Examples of the electrode forming step (2) include an electrode forming step including at least a carbon layer forming step and the conductive resin layer forming step (2A).

The solid electrolyte layer forming step is a step of forming a solid electrolyte layer on the outer surface of the cathode-forming body for solid electrolytic capacitors. A method of forming the solid electrolyte layer is not particularly limited and the solid electrolyte layer can be formed with known solid electrolytes produced by chemical methods. Examples of the solid electrolytes include conductive polymers such as polypyrrole, polyaniline, polythiophene, and polyacetylene.

The carbon layer forming step is a step of forming a carbon layer on the solid electrolyte layer. A method of forming the carbon layer is not particularly limited. Examples of the method include a method for applying a carbon paste including a resin, a solvent, and a carbon powder onto the solid electrolyte layer by the dipping method, and thereafter drying and/or curing the applied paste. The carbon powder is not particularly limited. A graphite powder is preferable.

The conductive resin layer forming step (2A) is the step of forming the conductive resin layer on the carbon layer by using the thermosetting conductive resin composition according to the present invention. The method of forming the conductive resin layer is not particularly limited. Examples of the method include a method for applying the conductive resin composition according to the present invention by the dipping method, the screen printing method, the roll coating method, and other methods, and subsequently curing the thermosetting conductive resin composition.

Another embodiment of the electrode forming step is an electrode forming step (3) in the case where the electrode-forming body for electronic components is an electrode-forming body for chip resistors equipped with end-surface electrodes. The electrode forming step (3) has, at least, a step of forming the conductive resin layer on the end-surface electrode. The method of forming the conductive resin layer is not particularly limited. Example of the method include a method for applying the thermosetting conductive resin composition according to the present invention by the dipping method, the screen printing method, the roll coating method, and other methods, and subsequently curing the thermosetting conductive resin composition according to the present invention. The electrode-forming body for chip resistors equipped with the end-surface electrodes includes an insulating substrate, a pair of top end electrodes formed on the insulating substrate, a resistor formed between the pair of top end electrodes, a protective layer formed so as to cover a part of the pair of top end electrodes and the resistor, and the end-surface electrodes formed on the end-surface of the insulating substrate.

Another embodiment of the electrode forming step is an electrode forming step (4) in the case where the electrode-forming body for electronic components is a substrate. The electrode forming step (4) includes at least a step of forming the conductive resin layer on the substrate. The method of forming the conductive resin layer is not particularly limited. Example of the method include a method of applying the thermosetting conductive resin composition according to the present invention by screen printing, inkjet printing, or dispenser printing, and subsequently curing the conductive composition according to the invention. Examples of the substrates include alumina substrates, glass epoxy substrates, paper-phenolic substrates, and paper-epoxy substrates.

Another embodiment of the electrode forming step is an electrode forming step (5) in the case where the electrode-forming body for electronic components is a film. The electrode forming step (5) includes at least a step of forming the conductive resin layer on the film. The method of forming the conductive resin layer is not particularly limited. Example of the method include a method of applying the thermosetting conductive resin composition according to the present invention by screen printing, inkjet printing, or dispenser printing, and subsequently curing the conductive composition according to the invention. Examples of films include polyimide films and PET films.

Hereinafter, the present invention will be described with reference to specific Experimental Examples. The present invention, however, is not limited to these Examples.

EXAMPLES

Production of Spherical Silver-Coated Copper Powder

A spherical silver-coated copper powder (Conductive Powder 1) coated with silver so that the ratio of silver was 10 parts by mass relative to 90 parts by mass of a spherical copper powder (type number: MA-CO3K, manufactured by MITSUI MINING & SMELTING CO., LTD.) was produced. The obtained spherical silver-coated copper powder was subjected to measurement using a laser diffraction particle size analyzer to determine the 50% value ($D_{50}$) in a volume-based accumulated fraction. The specific surface area was also measured by a BET method.

Production of Flake-shaped Silver-Coated Copper Powder

The spherical silver-coated copper powder was produced by the method described above. The obtained spherical silver-coated copper powder was pulverized in a ball mill using palmitic acid as a lubricant to produce a flake-shaped silver-coated copper powder (Conductive Powder 2). The number average particle diameters ($D_{50}$) and aspect ratios of 50 arbitrarily selected powder were measured in SEM (scanning electron microscope) image observation and the average values were determined. The specific surface area was also measured by a BET method.

Production of Spherical Silver Powder

First, a spherical silver powder (Conductive Powder 5) was prepared based on a spray pyrolysis method described in Japanese Patent Publication S63-31522-B. Namely, with respect to the spherical silver powder, an aqueous solution in which a silver salt is dissolved was subjected to spray pyrolysis, and the collected silver powder was subjected to classification treatment to adjust the $D_{50}$ value. The obtained silver powder was subjected to measurement using a laser diffraction particle size analyzer to determine the 50% value ($D_{50}$) in terms of the volume-based accumulated fraction. The specific surface area was also measured by a BET method.

Production of Flake-shaped Silver Powder

The spherical silver powder was produced by the method described above. The obtained spherical silver powder was pulverized in a ball mill using stearic acid as a lubricant to produce a flake-shaped silver powder (Conductive Powder 3). The number average particle diameters ($D_{50}$) and aspect ratios of 50 arbitrarily selected flake-shaped silver powder were measured in SEM (scanning electron microscope) image observation and the average values were determined. The specific surface area was also measured by a BET method.

Preparation of Conductive Resin Composition

Conductive resin compositions were prepared by blending the conductive powders and the silicone resin in the blending proportions listed in Table 1 and Table 2. The unit for the numerical values listed in Table 1 and Table 2 is parts by mass. In Tables, "BCA" is an abbreviation for butyl carbitol acetate and "BZA" is an abbreviation for benzyl alcohol.

Conductive Powder 1

Spherical silver-coated copper powder, $D_{50}$:4.0 μm, specific surface area: 0.5 $m^2/g$ Conductive Powder 2

Flake-shaped silver-coated copper powder, aspect ratio: 20, $D_{50}$:8.0 μm, specific surface area: 1.5 $m^2/g$ Conductive Powder 3

Flake-shaped silver powder, aspect ratio: 30, $D_{50}$:6.0 μm, specific surface area: 1.0 $m^2/g$.

Conductive Powder 4

Spherical nickel powder, $D_{50}$:0.8 μm, specific surface area: 1.2 $m^2/g$

Conductive Powder 5

Spherical silver powder, $D_{50}$:2.3 μm, specific surface area: 0.5 $m^2/g$.

Silicone Resin 1

Thermosetting silicone resin having hydroxyl groups, dehydration-condensation type, type number: ES-1001N, manufactured by Shin-Etsu Chemical Co., Ltd., different lots of Lot A and Lot B were used as Silicone Resin 1.

Silicone Resin 2

Thermosetting silicone resin without hydroxyl groups, addition curing type, type number: X-40-2756 (one-component type including curing catalyst), manufactured by Shin-Etsu Chemical Co., Ltd., other functional groups: alkenyl groups, methyl groups, phenyl groups.

Amine-based Additive 1: Dibutylamine

Secondary amine, molecular weight: 129.2, carbon number: 8, boiling point: 159° C., pKa: 11.3

Amine-Based Additive 2: N-lauryldiethanolamine

Tertiary amine, molecular weight: 273.5, carbon number: 16, pKa: 14

Amine-Based Additive 3: Triethanolamine

Tertiary amine, molecular weight: 149.2, carbon number: 6, boiling point: 335.4, pKa: 7.8.

Amine-Based Additive 4: Diisopropylamine

Secondary amine, molecular weight: 101.2, carbon number: 6, boiling point: 84° C., pKa: 11.1.

Amine-Based Additive 5: Dihexylamine

Secondary amine, molecular weight: 185.4, carbon number: 12, boiling point: 194° C.

Amine-Based Additive 6: Dimethyloctylamine

Tertiary amine, molecular weight: 157.3, carbon number: 10, boiling point: 195° C.

Acid-Based Additive 1: Octadecyl Butanedioic Acid

Dicarboxylic acid, molecular weight: 369, carbon number: 22, Td90:350° C.

Acid-Based Additive 2: Octenylsuccinic Acid

Dicarboxylic acid, molecular weight: 228.3, carbon number: 12

Acid/Base Mixture Additive 1

HIPLAAD ED401, manufactured by Kusumoto Chemicals, Ltd.

The amount of the resin in the following table refers to the amount of resin itself excluding a solvent.

Comparative Example 1

Silicone Resin 1, Conductive Powder 1, Conductive Powder 2, and butyl carbitol acetate were mixed in the proportion listed in Table 1 and thereafter the resultant mixture was kneaded using a three-roll mill (manufactured by INOUE MFG., INC.) to give a paste-like composition.

Example 1

Silicone Resin 1, Conductive Powder 1, Conductive Powder 2, Amine-based Additive 1, and butyl carbitol acetate were mixed in the proportion listed in Table 1 and thereafter the resultant mixture was kneaded using a three-roll mill (manufactured by INOUE MFG., INC.) to give a paste-like composition.

Example 2

Silicone Resin 1, Conductive Powder 1, Conductive Powder 2, Amine-based Additive 2, and butyl carbitol acetate were mixed in the proportion listed in Table 1 and thereafter the resultant mixture was kneaded using a three-roll mill (manufactured by INOUE MFG., INC.) to give a paste-like composition.

Examples 3 to 22 and Comparative Examples 2 to 6

The components listed in Table 1 or Table 2 were mixed in the proportions listed in Table 1 and Table 2 and thereafter the resultant mixtures were kneaded using a three-roll mill (manufactured by INOUE MFG., INC.) to give paste-like compositions.

The paste-like compositions obtained by Examples 1 to 19, Examples 21 and 22, Comparative Examples 1 to 3, and Comparative Example 5 and 6 described above were diluted with butyl carbitol acetate and the paste-like composition obtained by Example 20 and Comparative Example 4 were diluted with benzyl alcohol. These diluted liquids were adjusted so that a viscosity at 25° C. and a shear rate of 4 (1/s) was 30 Pa·s, and thereafter the following evaluations were conducted. The results are listed in Table 3 and Table 4.

Performance Evaluation (Moisture Permeability Amount)

The conductive resin composition was cast at a thickness of 250 μm onto a PET film and the cast composition was cured under conditions of 200° C. for 60 minutes to give a cured film. The obtained cured film was cut out in a circular shape having a diameter of 7.5 mm and the circular film was fixed with an adhesive so as to cover the bottle mouth of a 5 ml grass bottle containing 2 g of silica gel. Thereafter, the glass bottle was placed in a 750 ml container containing 100 ml of purified water so that the cured film did not come in contact with the purified water and the resultant container in a sealed state was placed in a dryer set at 65° C. and left to stand for 15 hours. The weight of the glass bottle was measured before and after placing the glass bottle in the dryer and the weight increase was determined as the moisture permeability amount. The sample having a moisture permeability amount of more than 80.0 mg was determined to be "Failed, low moisture resistance" and the sample having a moisture permeability amount of 80.0 mg or less was determined to be "Passed, high moisture resistance".

(Specific Resistance)

The conductive resin composition was cast at a width of 1 cm, a length of 5 cm, and a thickness of 50 μm on a slide glass substrate and cured under conditions of 200° C. for 60 minutes to give a cured film. The resistance of the cured film surface was measured by a 4-terminal method using a digital multimeter (KEITHLEY 2002, manufactured by Keithley Instruments, Inc.). The specific resistance was calculated from the obtained value and the sample thickness.

(Specific Resistance Decrease Ratio)

Each specific resistance of the viscosity-adjusted paste-like composition (X) including the additive (at least one of the amine-based additive and the acid-based additive) and the viscosity-adjusted paste-like composition (Y) having the same composition as the paste-like composition (X) except that the additive (at least one of the amine-based additive and the acid-based additive) was not included was determined to be (A) and (B), respectively. The specific resistance decrease ratio was calculated using the following formula:

$$\text{Specific resistance decrease ratio [\%]}=(1-((A)/(B))\times 100$$

(Viscosity Increase Ratio)

The viscosities of the viscosity-adjusted paste-like composition after 1 day and after 1 week or 4 weeks from the preparation were measured using a rotational viscometer (model number: HADV-II+ Pro or HBDV-II+, manufactured by Brookfield Engineering Laboratories, Inc.) under conditions of 25° C. and a shear rate of 4 (1/s). The ratio of the viscosity after 1 week or 4 weeks from the preparation relative to the viscosity after 1 day from the preparation was calculated as the viscosity increase ratio. The prepared viscosity-adjusted paste-like compositions were stored at 25° C. in airtight containers. The viscosity increase ratios for Examples 21 and 22 and Comparative Examples 5 and 6 were calculated based on the viscosity after 4 weeks of the preparation, while the viscosity increase ratios for the other Examples and Comparative Examples were calculated based on the viscosity after 1 week of the preparation.

(Viscosity Increase Inhibition Ratio)

Each viscosity increase ratio of the viscosity-adjusted paste-like composition (X) including the additive (at least one of the amine-based additive and the acid-based additive) and the viscosity increase ratio of the viscosity-adjusted paste-like composition (Y) having the same composition as the above paste composition (X) except that the additive (at least one of amine additive and acid additive) was not included, which were calculated by the method described above, was determined to be (C) and (D), respectively. The specific resistance decrease ratio was calculated by the following formula.

$$\text{Viscosity increase inhibition ratio [\%]}=(1-((C)/(D))\times 100$$

(Adhesion Strength)

The conductive resin composition was cast at a thickness of 50 μm on a slide glass substrate and an aluminum cylinder having a diameter of 3 mm was placed onto the cast composition. The resultant cast composition was cured under conditions of 200° C. for 60 minutes. A value was measured at the time of break by pulling the sample using a bond tester (Model No.: SS-30WD, manufactured by Seishin Trading Co., Ltd.) at a speed of 0.5 mm/s in a vertical direction.

(Cured Film Density)

The conductive resin composition was cast onto a PET film at a thickness of 250 μm to form a coating film, and the coating film was cured under conditions of an air atmosphere at 150° C. for 10 minutes to form a cured film. The obtained cured film was cut into a circular shape and the weight and volume of the cut cured film were measured. The cured film density ($g/cm^3$) was calculated as the ratio of the weight (g) to the volume ($cm^3$).

TABLE 1

| | Conductive Powder 1 | Conductive Powder 2 | Conductive Powder 3 | Conductive Powder 4 | Silicone Resin 1 | Resin Lot | Butyral Resin 1 | Solvent Type | Amine-based Additive 1 |
|---|---|---|---|---|---|---|---|---|---|
| Comp. Ex. 1 | 40 | 60 | — | — | 16.0 | A | — | BCA | — |
| Ex. 1 | 40 | 60 | — | — | 16.0 | A | — | BCA | 0.8 |
| Ex. 2 | 40 | 60 | — | — | 16.0 | A | — | BCA | — |
| Comp. Ex. 2 | 40 | 60 | — | — | 16.0 | B | — | BCA | — |
| Ex. 3 | 40 | 60 | — | — | 16.0 | B | — | BCA | 0.05 |
| Ex. 4 | 40 | 60 | — | — | 16.0 | B | — | BCA | 0.1 |
| Ex. 5 | 40 | 60 | — | — | 16.0 | B | — | BCA | 0.8 |
| Ex. 6 | 40 | 60 | — | — | 16.0 | B | — | BCA | 1.6 |
| Ex. 7 | 40 | 60 | — | — | 16.0 | B | — | BCA | 3.2 |
| Ex. 8 | 40 | 60 | — | — | 16.0 | B | — | BCA | — |
| Ex. 9 | 40 | 60 | — | — | 16.0 | B | — | BCA | — |
| Ex. 10 | 40 | 60 | — | — | 16.0 | B | — | BCA | — |
| Ex. 11 | 40 | 60 | — | — | 16.0 | B | — | BCA | — |
| Ex. 12 | 40 | 60 | — | — | 16.0 | B | — | BCA | — |
| Ex. 13 | 40 | 60 | — | — | 16.0 | B | — | BCA | — |
| Ex. 14 | 40 | 60 | — | — | 16.0 | B | — | BCA | — |
| Ex. 15 | 40 | 60 | — | — | 16.0 | B | — | BCA | — |
| Ex. 16 | 40 | 60 | — | — | 16.0 | B | — | BCA | — |
| Ex. 17 | 40 | 60 | — | — | 16.0 | B | — | BCA | 0.4 |
| Ex. 18 | 40 | 60 | — | — | 16.0 | B | — | BCA | — |
| Comp. Ex. 3 | 40 | 60 | — | — | 8.0 | B | 8.0 | BCA | — |
| Ex. 19 | 40 | 60 | — | — | 8.0 | B | 8.0 | BCA | 0.4 |
| Comp. Ex. 4 | 40 | 60 | — | — | 16.0 | B | — | BZA | — |
| Ex. 20 | 40 | 60 | — | — | 16.0 | B | — | BZA | 0.8 |

| | Amine-based Additive 2 | Amine-based Additive 3 | Amine-based Additive 4 | Amine-based Additive 5 | Amine-based Additive 6 | Acid-based Additive 1 | Acid/Base Mixture Additive 1 | Parts by Mass of Additive Relative to 100 Parts by Mass of Silicone Resin |
|---|---|---|---|---|---|---|---|---|
| Comp. Ex. 1 | — | — | — | — | — | — | — | — |
| Ex. 1 | — | — | — | — | — | — | — | 5.0 |
| Ex. 2 | 0.8 | — | — | — | — | — | — | 5.0 |
| Comp. Ex. 2 | — | — | — | — | — | — | — | — |
| Ex. 3 | — | — | — | — | — | — | — | 0.3 |
| Ex. 4 | — | — | — | — | — | — | — | 0.6 |
| Ex. 5 | — | — | — | — | — | — | — | 5.0 |
| Ex. 6 | — | — | — | — | — | — | — | 10.0 |
| Ex. 7 | — | — | — | — | — | — | — | 20.0 |
| Ex. 8 | — | 0.8 | — | — | — | — | — | 5.0 |
| Ex. 9 | — | — | 0.8 | — | — | — | — | 5.0 |
| Ex. 10 | — | — | — | 0.8 | — | — | — | 5.0 |
| Ex. 11 | — | — | — | — | 0.8 | — | — | 5.0 |
| Ex. 12 | — | — | — | — | — | 0.05 | — | 0.3 |
| Ex. 13 | — | — | — | — | — | 0.1 | — | 0.6 |
| Ex. 14 | — | — | — | — | — | 0.8 | — | 5.0 |
| Ex. 15 | — | — | — | — | — | 1.6 | — | 10.0 |
| Ex. 16 | — | — | — | — | — | 3.2 | — | 20.0 |
| Ex. 17 | — | — | — | — | — | 0.4 | — | 5.0 |
| Ex. 18 | — | — | — | — | — | — | 0.8 | 5.0 |
| Comp. Ex. 3 | — | — | — | — | — | — | — | — |
| Ex. 19 | — | — | — | — | — | — | — | 5.0 |
| Comp. Ex. 4 | — | — | — | — | — | — | — | — |
| Ex. 20 | — | — | — | — | — | — | — | 5.0 |

TABLE 2

| | Conductive Powder 1 | Conductive Powder 2 | Conductive Powder 3 | Conductive Powder 4 | Silicone Resin 1 | Resin Lot | Butyral Resin 1 | Solvent Type | Amine-based Additive 1 |
|---|---|---|---|---|---|---|---|---|---|
| Comp. Ex. 5 | — | — | 60 | 40 | 16.0 | B | — | BCA | — |
| Ex. 21 | — | — | 60 | 40 | 16.0 | B | — | BCA | 0.8 |
| Comp. Ex. 6 | 40 | 60 | — | — | 4.8 | B | 11.2 | BCA | — |
| Ex. 22 | 40 | 60 | — | — | 4.8 | B | 11.2 | BCA | 0.24 |

| | Amine-based Additive 2 | Amine-based Additive 3 | Amine-based Additive 4 | Amine-based Additive 5 | Amine-based Additive 6 | Acid-based Additive 1 | Acid/Base Mixture Additive 1 | Parts by Mass of Additive Relative to 100 Parts by Mass of Silicone Resin |
|---|---|---|---|---|---|---|---|---|
| Comp. Ex. 5 | — | — | — | — | — | — | — | — |
| Ex. 21 | — | — | — | — | — | — | — | 5.0 |
| Comp. Ex. 6 | — | — | — | — | — | — | — | — |
| Ex. 22 | — | — | — | — | — | — | — | 5.0 |

TABLE 3

| | Moisture Permeability Amount [mg] | Specific Resistance [μΩ · cm] | Specific Resistance Decrease Ratio [%] | Viscosity Increase Ratio [times] | Viscosity Increase inhibition Ratio [%] | Adhesion Strength [kg] | Cured Film Density [g/cm$^3$] |
|---|---|---|---|---|---|---|---|
| Comp. Ex. 1 | 8.3 | $6.6 \times 10^5$ | — | 15.8 | — | 7.2 | 4.3 |
| Ex. 1 | 9.2 | $2.4 \times 10^4$ | 96 | 1.7 | 89.2 | 7.4 | 4.1 |
| Ex. 2 | 9.7 | $1.5 \times 10^4$ | 98 | 1.5 | 90.5 | 7.3 | 4.1 |
| Comp. Ex. 2 | 3.3 | $1.2 \times 10^3$ | — | 14.0 | — | 6.7 | 4.7 |
| Ex. 3 | 4.1 | $9.0 \times 10^2$ | 25 | 10.1 | 27.9 | 7.0 | 4.7 |
| Ex. 4 | 4.9 | $5.4 \times 10^2$ | 55 | 3.7 | 73.6 | 7.8 | 4.6 |
| Ex. 5 | 4.1 | $5.4 \times 10^2$ | 55 | 1.2 | 91.4 | 7.5 | 4.1 |
| Ex. 6 | 3.8 | $4.5 \times 10^2$ | 63 | 1.4 | 90.0 | 7.2 | 4.1 |
| Ex. 7 | 7.0 | $1.2 \times 10^2$ | 90 | 2.9 | 79.3 | 5.8 | 4.1 |
| Ex. 8 | 28.3 | $2.3 \times 10^2$ | 81 | 1.5 | 89.3 | 4.7 | 3.6 |
| Ex. 9 | 6.4 | $8.1 \times 10^2$ | 33 | 1.7 | 87.9 | 5.0 | 4.0 |
| Ex. 10 | 6.5 | $9.4 \times 10^2$ | 22 | 1.8 | 87.1 | 4.4 | 4.0 |
| Ex. 11 | 15.8 | $9.8 \times 10^2$ | 18 | 2.0 | 85.7 | 3.9 | 3.8 |
| Ex. 12 | 4.3 | $5.5 \times 10^2$ | 54 | 7.8 | 44.3 | 8.1 | 4.6 |
| Ex. 13 | 3.9 | $4.3 \times 10^2$ | 64 | 7.7 | 45.0 | 7.2 | 4.4 |
| Ex. 14 | 7.1 | $6.4 \times 10^2$ | 46 | 1.5 | 89.3 | 6.5 | 4.2 |
| Ex. 15 | 6.5 | $7.8 \times 10^2$ | 35 | 1.3 | 90.7 | 4.7 | 4.0 |
| Ex. 16 | 6.2 | $8.3 \times 10^2$ | 31 | 1.3 | 90.7 | 3.7 | 3.9 |
| Ex. 17 | 3.8 | $2.9 \times 10^2$ | 76 | 1.3 | 90.7 | 8.3 | 4.4 |
| Ex. 18 | 4.1 | $1.4 \times 10^2$ | 89 | 2.6 | 81.4 | 9.0 | 4.3 |
| Comp. Ex. 3 | 21.4 | $6.2 \times 10^2$ | — | 4.2 | — | 5.9 | — |
| Ex. 19 | 25.5 | $4.2 \times 10^2$ | 32 | 1.4 | 66.7 | 5.7 | — |
| Comp. Ex. 4 | 4.0 | $1.4 \times 10^3$ | — | 2.8 | — | 3.1 | 4.5 |
| Ex. 20 | 3.8 | $6.0 \times 10^2$ | 57 | 1.4 | 50.0 | 3.2 | 4.5 |

TABLE 4

| | Moisture Permeability Amount [mg] | Specific Resistance [μΩ · cm] | Specific Resistance Decrease Ratio [%] | Viscosity Increase Ratio [times] | Viscosity Increase inhibition Ratio [%] | Adhesion Strength [kg] | Cured Film Density [g/cm$^3$] |
|---|---|---|---|---|---|---|---|
| Comp. Ex. 5 | 4.3 | $3.8 \times 10^2$ | — | 2.4 | — | 7.0 | — |
| Ex. 21 | 4.5 | $3.0 \times 10^2$ | 52 | 1.2 | 50.0 | 6.2 | — |

TABLE 4-continued

| | Moisture Permeability Amount [mg] | Specific Resistance [μΩ · cm] | Specific Resistance Decrease Ratio [%] | Viscosity Increase Ratio [times] | Viscosity Increase inhibition Ratio [%] | Adhesion Strength [kg] | Cured Film Density [g/cm$^3$] |
|---|---|---|---|---|---|---|---|
| Comp. Ex. 6 | 33.3 | $4.7 \times 10^2$ | — | 2.4 | — | 4.2 | — |
| Ex. 22 | 34.0 | $4.0 \times 10^2$ | 15 | 1.7 | 29.2 | 4.1 | — |

From the results in Tables 3 and 4, it was exhibited that the conductive resin compositions of Example 1 and Example 2 had extremely low specific resistance compared to that of the conductive resin composition of Comparative Example 1 and also had high viscosity stability compared to that of the conductive resin composition of Comparative Example 1. From these results, it was found that the conductive resin compositions of Example 1 and Example 2 were possible to produce electronic components having excellent conductivity compared to the case where the conductive resin composition of Comparative Example 1 was used. In addition, it was found that the conductive resin compositions of Example 1 and Example 2 had high viscosity stability compared to that of the conductive resin composition of Comparative Example 1 and thus a coating shape was excellent even in the case where electronic components were produced using the conductive resin compositions after a certain period of time passed from the preparation. As a result, the conductive resin compositions of Example 1 and Example 2 were possible to produce electronic components having high moisture resistance compared to the case where the conductive resin composition of the Comparative Example 1 was used. Similar to the conductive resin compositions of Example 1 and Example 2, the specific resistance decrease effect and the viscosity increase inhibition effect of the conductive resin compositions of Examples 3 to 22 were also confirmed.

Reference Example 1

A viscosity-adjusted paste-like composition was obtained by the same method as the method in Comparative Example 1 except that 40 parts by mass of Conductive Powder 5 and 60 parts by mass of Conductive Powder 3 were used as the conductive powder. When the above evaluations were conducted, the viscosity increase ratio was 1.1 times. In other words, in the case where the silver powder was used as the conductive powder, a problem related to the viscosity stability did not occur.

Reference Example 2

A paste-like composition was obtained using the same method as the method in Comparative Example 1 except that Silicone Resin 2 was used instead of Silicone Resin 1. The obtained paste-like compositions were diluted with butyl carbitol acetate and adjusted so that a viscosity at 25° C. and a shear rate of 4 (1/s) was 30 Pa·s, and thereafter the evaluation was conducted. The viscosity increase ratio was 0.9 times. In other words, in the case where the addition curing type silicone resin was used as the silicone resin, a problem related to the viscosity stability did not occur.

Example 23

Each metal paste was prepared and evaluated in the same method as the methods in Comparative Example 1 and Example 1 except that 100 parts by mass of each spherical tin powder, spherical zinc powder, and spherical aluminum powder was used as the conductive powder. The specific resistance decrease effect and the viscosity increase inhibition effect due to the amine-based additive were possible to be confirmed and exhibiting high moisture resistance was possible to be confirmed. In particular, in the case where the spherical tin powder was used as the conductive powder, the specific resistance exceeded the upper limit of measurement when neither the amine-based additive nor the acid-based additive according to the present invention was included, whereas when 5.0 parts by mass of Amine-based Additive 1 as the additive according to the present invention was included relative to 100 parts by mass of the silicone resin, the conductivity was dramatically increased. The specific resistance was $2.9\times10^3$ μΩ·cm, and the specific resistance decrease ratio was more than 99%.

Example 24

Using another thermosetting silicone resins having hydroxyl groups instead of Silicone Resin 1, a paste was prepared and evaluated in the same method as the methods of Comparative Example 1 and Example 1 described above. The specific resistance decrease effect and the viscosity increase inhibition effect due to the amine-based additive were possible to be confirmed and exhibiting high moisture resistance was possible to be confirmed.

The invention claimed is:

1. A thermosetting conductive resin composition comprising:

a conductive powder including a base metal;

a resin binder comprising at least a thermosetting silicone resin having hydroxyl groups and being curable by heating without using a curing agent or a catalyst; and at least one of an amine-based additive and an acid-based additive, wherein a content of the resin binder is 3.0 parts by mass or more and 30.0 parts by mass or less relative to 100 parts by mass of the conductive powder, and the thermosetting conductive resin composition satisfies at least one of the following (1) and (2):

(1) a content of the amine-based additive is 0.3 parts by mass or more and 20.0 parts by mass or less relative to 100 parts by mass of the thermosetting silicone resin having the hydroxyl groups and being curable by heating without using the curing agent or the catalyst, and/or a content of the acid-based additive is 0.05 parts by mass or more and 3.2 parts by mass or less relative to 100 parts by mass of the conductive powder including the base metal, and (2) the content of the amine-based additive is 0.05 parts by mass or more and 3.2 parts by mass or less relative to 100 parts by mass of the conductive powder including the base metal.

2. The thermosetting conductive resin composition according to claim 1, wherein a molecular weight of the amine-based additive or the acid-based additive is 30 or more and 2,000 or less.

3. The thermosetting conductive resin composition according to claim 1, wherein a boiling point Tb under 1 atm or a temperature Td90 at 90% by mass reduction of the amine-based additive or the acid-based additive is 80° C. or more and 400° C. or less.

4. The thermosetting conductive resin composition according to claim 1, wherein the amine-based additive comprises at least one of a secondary amine and a tertiary amine.

5. The thermosetting conductive resin composition according to claim 1, wherein the acid-based additive comprises a dicarboxylic acid.

6. The thermosetting conductive resin composition according to claim 1, satisfying at least one of the following (1') and (2'), (1') a content of the amine-based additive is 0.6 parts by mass or more and 10.0 parts by mass or less relative to 100 parts by mass of the thermosetting silicone resin having hydroxyl groups and being curable by heating without using the curing agent or the catalyst, and/or a content of the acid-based additive is 0.1 parts by mass to 1.6 parts by mass relative to 100 parts by mass of the conductive powder including the base metal, and (2') the content of the amine-based additive is 0.1 parts by mass or more and 1.6 parts by mass or less relative to 100 parts by mass of the conductive powder including the base metal.

7. The thermosetting conductive resin composition according to claim 1, wherein the thermosetting silicone resin having hydroxyl groups and being curable by heating without using a curing agent or a catalyst is a dehydration condensation-type thermosetting silicone resin having hydroxyl groups and being curable by a dehydration condensation reaction that proceeds by heating without using a curing agent or a catalyst.

8. The thermosetting conductive resin composition according to claim 1 for forming an external electrode of multilayer electronic components or for forming a cathode of solid electrolytic capacitors.

9. The thermosetting conductive resin composition according to claim 1, further comprising an organic solvent.

10. The thermosetting conductive resin composition according to claim 1, further comprising a resin binder other than the thermosetting silicone resin having hydroxyl groups and being curable by heating without using a curing agent or a catalyst.

11. The thermosetting conductive resin composition according to claim 1, comprising the amine-based additive, wherein the base metal is Cu.

12. The thermosetting conductive resin composition according to claim 1 being curable by heating at a heating temperature in the range of 150° C. to 300° C.

13. The thermosetting conductive resin composition according to claim 1 having 80.0 mg or less of a moisture permeability amount as determined casting the thermosetting conductive resin composition on a PET film to a thickness of 250 μm to obtain a cast composition, curing the cast composition at 200° C. for 60 minutes to obtain a cured film, cutting the cured film into a circular shape having a diameter of 7.5 mm, fixing the cured film with an adhesive so as to cover a 5 ml glass bottle containing 2 g of silica gel, placing the glass bottle in a 750 ml container containing 100 ml of purified water so that the cured film does not come in contact with the purified water, sealing and placing the 750 ml container in a dryer at 65° C. for 15 hours, measuring a weight of the glass bottle before and after the glass bottle is placed in the dryer, and calculating the moisture permeability amount by subtracting the weight of the glass bottle before being placed in the dryer from the weight of the glass bottle after being placed in the dryer.

14. A method for producing an electronic component, the method comprising:

a preparation step of preparing an electrode-forming body for electronic components; and an electrode forming step of forming an electrode on an outer surface of the electrode-forming body for electronic components, wherein a conductive resin layer is formed on the electrode-forming body for electronic components by applying the thermosetting conductive resin composition according to claim 1 onto the electrode-forming body for electronic components and subsequently curing the thermosetting conductive resin composition in the electrode forming step.

15. The method for producing an electronic component according to claim 14, wherein the thermosetting conductive resin composition is curable by heating at a heating temperature in the range of 150° C. to 300° C.

* * * * *